United States Patent
Ye

(10) Patent No.: US 10,386,683 B2
(45) Date of Patent: Aug. 20, 2019

(54) LIQUID CRYSTAL DISPLAY PANEL AND PIXEL UNIT THEREOF

(71) Applicant: SHENZHEN CHINA STAR OPTOELECTRONICS SEMICONDUCTOR DISPLAY TECHNOLOGY CO., LTD., Guangdong (CN)

(72) Inventor: Yanxi Ye, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/576,758

(22) PCT Filed: Nov. 2, 2017

(86) PCT No.: PCT/CN2017/109108
§ 371 (c)(1),
(2) Date: Nov. 24, 2017

(87) PCT Pub. No.: WO2019/051958
PCT Pub. Date: Mar. 21, 2019

(65) Prior Publication Data
US 2019/0086743 A1    Mar. 21, 2019

(30) Foreign Application Priority Data

Sep. 15, 2017 (CN) .......................... 2017 1 0831086

(51) Int. Cl.
*G02F 1/1343* (2006.01)
*G02F 1/1335* (2006.01)

(52) U.S. Cl.
CPC .... *G02F 1/134336* (2013.01); *G02F 1/13439* (2013.01); *G02F 1/133512* (2013.01); *G02F 2001/134345* (2013.01); *G02F 2201/121* (2013.01); *G02F 2201/123* (2013.01)

(58) Field of Classification Search
CPC ......... G02F 1/135336; G02F 1/134309; G02F 1/133512; G02F 2201/121; G02F 2201/123
See application file for complete search history.

(56) References Cited

U.S. PATENT DOCUMENTS

2017/0176822 A1*  6/2017  Yoon ................. G02F 1/133514

FOREIGN PATENT DOCUMENTS

CN         101740581   *   8/2013   ....... G02F 1/134336

* cited by examiner

*Primary Examiner* — James A Dudek
(74) *Attorney, Agent, or Firm* — Muncy, Geissler, Olds & Lowe, P.C.

(57) ABSTRACT

A pixel unit is provided and has a peripheral border surrounding a pixel electrode; a main electrode connected with the peripheral border and having a horizontal main electrode together with a longitudinal main electrode being cross-shaped; and branch electrodes connected with the peripheral border and the main electrode. The horizontal main electrode has a first through hole and the longitudinal main electrode has a second through hole. The first through hole and the second through hole in communication with each other, such that the main electrode forms a cross-ring shape.

15 Claims, 2 Drawing Sheets

LIQUID CRYSTAL DISPLAY PANEL AND PIXEL UNIT THEREOF

FIELD OF THE DISCLOSURE

The present disclosure relates to the technical field of displays, and more particularly to a liquid crystal display panel and a pixel unit thereof.

BACKGROUND OF THE DISCLOSURE

In liquid crystal display technologies, HVA (PSVA) mode is one of many modes. A pixel structure of the HVA mode does not require protrusions and has greater advantages than PVA and MVA, such as reduced number of process of the protrusions, reduced topography effects caused by the protrusions, and reduced effect of particles caused by the protrusions.

To solve viewing angles of the VA mode, a normal pixel design of HVA is same to those of other VA modes, which a pixel region is divided into a plurality of domains. In general, the plurality of domains are four. FIG. 4 is a pixel structural diagram of the conventional HVA. A cross-shaped main electrode 401 is in a middle of the pixel electrode, i.e., a boundary between the domains, which is also a place causing dark fringes. The dark fringes are inevitably induced between the domains due to inverse of tilting direction of the liquid crystals. The dark fringes are induced by conflict of the tilting direction of the liquid crystals. However, tilting of the liquid crystals is also affected by topography, so the appearance of the dark fringes can be irregular.

From the above, in the conventional pixel structure, due to the tilting direction of the liquid crystals in a region corresponding to the cross-shaped main electrode being reversed, the dark fringes are inevitably induced so as to affect performance of display devices.

SUMMARY OF THE DISCLOSURE

The present disclosure provides a liquid crystal display panel and a pixel unit thereof, which can decrease production of dark fringes at a cross-shaped main electrode of a pixel electrode, so as to raise properties of display devices.

To solve the above problem, a technical solution provided by the present disclosure is as follows:

The present disclosure provides a pixel unit including:
a peripheral border surrounding a pixel electrode;
a main electrode connected with the peripheral border and being cross-shaped, wherein the main electrode includes a horizontal main electrode and a longitudinal main electrode perpendicular to each other, and the horizontal main electrode and the longitudinal main electrode divide the pixel electrode into four domains;
branch electrodes, an end of each of the branch electrodes is connected with the peripheral border, another opposite end is connected with the horizontal main electrode or the longitudinal main electrode;
wherein, in one of the domains of the pixel electrode, the branch electrodes are arranged parallel to each other and spaced from each other, and each of the branch electrodes is connected with the horizontal main electrode or the longitudinal main electrode at a first predetermined angle;
wherein a first branch electrode is parallel to a fourth branch electrode, a second branch electrode is parallel to a third branch electrode, and a second predetermined angle is between the first branch electrode and the third branch electrode;
wherein the horizontal main electrode has a first through hole and the longitudinal main electrode has a second through hole, the first through hole and the second through hole in communication with each other, such that the main electrode forms a cross-ring shape; and
wherein a hollow structure is located at a center of intersection of the horizontal main electrode and the longitudinal main electrode, and the first sub-pixel electrode, the second sub-pixel electrode, the third sub-pixel electrode, and the fourth sub-pixel electrode are connected with each other by the peripheral border.

According to one preferred embodiment of the present disclosure, the pixel unit further includes a light shielding metal layer and a common electrode, wherein the light shielding metal layer has a light shielding electrode, wherein a horizontal light shielding electrode corresponds to the horizontal main electrode, a longitudinal light shielding electrode corresponds to the longitudinal main electrode, and the horizontal light shielding electrode and the longitudinal light shielding electrode are both connected with the common electrode.

According to one preferred embodiment of the present disclosure, a projection of the horizontal light shielding electrode at the pixel electrode covers the first through hole, and a projection of the longitudinal light shielding electrode at the pixel electrode covers the second through hole.

According to one preferred embodiment of the present disclosure, a width of the horizontal light shielding electrode is same as a width of the longitudinal light shielding electrode.

According to one preferred embodiment of the present disclosure, the first through hole extends in an extending direction along the horizontal main electrode from an end of the horizontal main electrode to another end of the horizontal main electrode, and the second through hole extends in an extending direction along the longitudinal main electrode from an end of the longitudinal main electrode to another end of the longitudinal main electrode; and wherein the first through hole and the second through hole divide the pixel electrode into a first sub-pixel electrode, a second sub-pixel electrode, a third sub-pixel electrode, and a fourth sub-pixel electrode.

According to one preferred embodiment of the present disclosure, first main sub-electrodes in a region of the first through hole of the horizontal main electrode extend in an extending direction along the branch electrodes until the first main sub-electrodes intersect, and second main sub-electrodes in a region of the second through hole of the longitudinal main electrode extend in an extending direction along the branch electrodes until the second main sub-electrodes intersect.

According to one preferred embodiment of the present disclosure, the first main sub-electrodes and the second main sub-electrodes overlap at an intersection of the horizontal main electrode and the longitudinal main electrode.

According to one preferred embodiment of the present disclosure, a fifth sub-pixel electrode extends from an end of the horizontal main electrode to the peripheral border outwardly, and in a corresponding region of the fifth sub-pixel electrode corresponding to the horizontal main electrode, the pixel electrode is connected with a switching unit through a third through hole.

The present disclosure further provides a liquid crystal display panel including the pixel unit described above.

The present disclosure further provides a pixel unit including:
- a peripheral border surrounding a pixel electrode;
- a main electrode connected with the peripheral border and being cross-shaped, wherein the main electrode includes a horizontal main electrode and a longitudinal main electrode perpendicular to each other, and the horizontal main electrode and the longitudinal main electrode divide the pixel electrode into four domains;
- branch electrodes, an end of each of the branch electrodes is connected with the peripheral border, another opposite end is connected with the horizontal main electrode or the longitudinal main electrode;
- wherein, in one of the domains of the pixel electrode, the branch electrodes are arranged parallel to each other and spaced from each other, and each of the branch electrodes is connected with the horizontal main electrode or the longitudinal main electrode at a first predetermined angle;
- wherein a first branch electrode is parallel to a fourth branch electrode, a second branch electrode is parallel to a third branch electrode, and a second predetermined angle is between the first branch electrode and the third branch electrode; and
- wherein the horizontal main electrode has a first through hole and the longitudinal main electrode has a second through hole, the first through hole and the second through hole in communication with each other, such that the main electrode forms a cross-ring shape.

According to one preferred embodiment of the present disclosure, the pixel unit further includes a light shielding metal layer and a common electrode, wherein the light shielding metal layer has a light shielding electrode, wherein a horizontal light shielding electrode corresponds to the horizontal main electrode, a longitudinal light shielding electrode corresponds to the longitudinal main electrode, and the horizontal light shielding electrode and the longitudinal light shielding electrode are both connected with the common electrode.

According to one preferred embodiment of the present disclosure, a projection of the horizontal light shielding electrode at the pixel electrode covers the first through hole, and a projection of the longitudinal light shielding electrode at the pixel electrode covers the second through hole.

According to one preferred embodiment of the present disclosure, a width of the horizontal light shielding electrode is same as a width of the longitudinal light shielding electrode.

According to one preferred embodiment of the present disclosure, the first through hole extends in an extending direction along the horizontal main electrode from an end of the horizontal main electrode to another end of the horizontal main electrode, and the second through hole extends in an extending direction along the longitudinal main electrode from an end of the longitudinal main electrode to another end of the longitudinal main electrode; and wherein the first through hole and the second through hole divide the pixel electrode into a first sub-pixel electrode, a second sub-pixel electrode, a third sub-pixel electrode, and a fourth sub-pixel electrode.

According to one preferred embodiment of the present disclosure, first main sub-electrodes in a region of the first through hole of the horizontal main electrode extend in an extending direction along the branch electrodes until the first main sub-electrodes intersect, and second main sub-electrodes in a region of the second through hole of the longitudinal main electrode extend in an extending direction along the branch electrodes until the second main sub-electrodes intersect.

According to one preferred embodiment of the present disclosure, the first main sub-electrodes and the second main sub-electrodes overlap at an intersection of the horizontal main electrode and the longitudinal main electrode.

According to one preferred embodiment of the present disclosure, a fifth sub-pixel electrode extends from an end of the horizontal main electrode to the peripheral border outwardly, and in a corresponding region of the fifth sub-pixel electrode corresponding to the horizontal main electrode, the pixel electrode is connected with a switching unit through a third through hole.

The beneficial effects of the present disclosure are that: compared with a pixel unit of the conventional technology, in the pixel unit of the present disclosure, a hollowing process is correspondingly performed on a cross-shaped main electrode of a pixel electrode, such that the main electrode forms a hollow and cross-ring structure. The corresponding hollowed region of the main electrode forms a topography with grooves so as to cause liquid crystals having a certain orientation. The irregular dark fringes will not be induced by an interaction of different tilting directions of the liquid crystals in the corresponding hollowed region. Further, an electric field strength is decreased in the corresponding hollowed region of the cross-shape main electrode of the pixel electrode, and the effect of the electric field on the liquid crystals is also decreased, such that the tilting conflict of liquid crystals between the different sub-pixel electrodes divided by the main electrode will also be decreased. Therefore, the effect of the dark fringes is greatly reduced.

DESCRIPTION OF THE DRAWINGS

In order to more clearly describe embodiments of the present disclosure or technical solutions in a conventional technology, drawings required to be used for the embodiments or descriptions of the conventional technology are simply described hereinafter. Apparently, the drawings described below only illustrate some embodiments of the present disclosure. Those skilled in the art can obtain other drawings based on these drawings disclosed herein without creative effort.

DETAILED DESCRIPTION OF THE PREFERRED EMBODIMENTS

The present disclosure focuses on the technical problem that, in the conventional pixel structure, due to the tilting direction of the liquid crystals in a region corresponding to the cross-shaped main electrode being reversed, the dark fringes are inevitably induced so as to affect performance of display devices. The present embodiment can solve the drawback.

A liquid crystal display panel and a pixel unit thereof provided by a specific embodiment of the present disclosure will be described in detail below with reference to the accompanying drawings.

Figure 1:
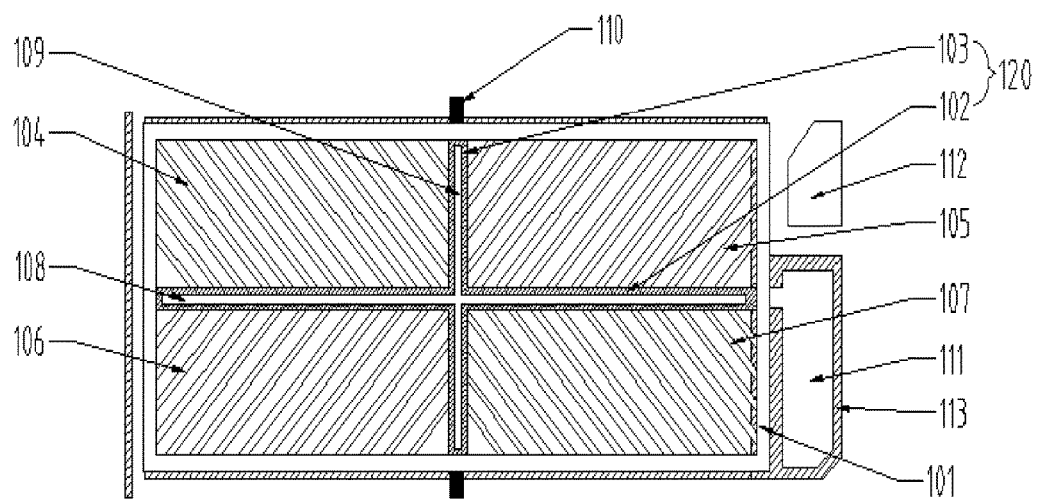
FIG. 1 is a structural schematic diagram of a pixel unit provided by embodiment 1 of the present disclosure.

As shown in FIG. 1, which is a structural schematic diagram of a pixel unit provided by embodiment 1 of the present disclosure, the pixel unit includes: a peripheral border 101 surrounding a pixel electrode; a main electrode 120 connected with the peripheral border 101 and being cross-shaped, where the main electrode 120 includes a horizontal main electrode 102 and a longitudinal main electrode 103 perpendicular to each other, and the horizontal main electrode 102 and the longitudinal main electrode 103 divide the pixel electrode into four domains; branch electrodes, where an end of each of the branch electrodes is connected with the peripheral border 101, another opposite end is connected with the horizontal main electrode 102 or the longitudinal main electrode 103. In one of the domains of the pixel electrode, the branch electrodes are arranged parallel to each other and spaced from each other, and each of the branch electrodes is connected with the horizontal main electrode 102 or the longitudinal main electrode 103 at a first predetermined angle. The first predetermined angle is preferably at an angle between 10 degrees and 80 degrees. A first branch electrode 104 is parallel to a fourth branch electrode 107, a second branch electrode 105 is parallel to a third branch electrode 106, and a second predetermined angle is between the first branch electrode 104 and the third branch electrode 106. The second predetermined angle is preferably at an angle between 60 degrees and 120 degrees. The horizontal main electrode 102 has a first through hole 108 and the longitudinal main electrode 103 has a second through hole 109. The first through hole 108 and the second through hole 109 in communication with each other, such that the main electrode 120 forms a cross-ring shape.

The pixel unit further includes a light shielding metal layer and a common electrode, where the light shielding metal layer has a light shielding electrode, where a horizontal light shielding electrode (not shown) corresponds to the horizontal main electrode 102, a longitudinal light shielding electrode 110 corresponds to the longitudinal main electrode 103, and the horizontal light shielding electrode and the longitudinal light shielding electrode 110 are both connected with the common electrode. A projection of the horizontal light shielding electrode at the pixel electrode covers the first through hole 108, and a projection of the longitudinal light shielding electrode 110 at the pixel electrode covers the second through hole 109. A width of the horizontal light shielding electrode is same as a width of the longitudinal light shielding electrode 110.

The first through hole 108 extends in an extending direction along the horizontal main electrode 102 from an end of the horizontal main electrode 102 to another end of the horizontal main electrode 102, and the second through hole 109 extends in an extending direction along the longitudinal main electrode 103 from an end of the longitudinal main electrode 103 to another end of the longitudinal main electrode 103. The first through hole 108 and the second through hole 109 divide the pixel electrode into a first sub-pixel electrode, a second sub-pixel electrode, a third sub-pixel electrode, and a fourth sub-pixel electrode. A fifth sub-pixel electrode 111 extends from an end of the horizontal main electrode 102 to the peripheral border 101 outwardly, and in a corresponding region of the fifth sub-pixel electrode 111 corresponding to the horizontal main electrode 102, the pixel electrode is connected with a switching unit 112 through a third through hole (nor shown). The light shielding metal layer further includes a metal light-shielding layer 113. An area of the metal light-shielding layer 113 is greater than an area of the fifth sub-pixel electrode 111. The metal light-shielding layer 113 is used to shield the fifth sub-pixel electrode 111 and the peripheral border 101 neighboring a side of the switching unit 112.

A position corresponding to the first through hole 108 and the second through hole 109 forms a topography with grooves so as to cause liquid crystals to have a certain orientation. The irregular dark fringes will not be induced by an interaction of different tilting directions of the liquid crystals in the corresponding hollowed region. Further, due to the main electrode 120 of the pixel electrode being a hollow and cross-ring structure, an electric field strength is decreased in the main electrode 120, and the effect of the electric field on the liquid crystals is also decreased. The tilting conflict of liquid crystals of the main electrode 120 between different sub-pixels will also be decreased, thereby reducing the effect of the dark fringes.

In the embodiment, the first through hole 108 and the second through hole 109 can also be formed and distributed with intervals. For example, number of the first through holes 108 is at least two. The first through holes 108 are formed with intervals in a row in an extending direction along the horizontal main electrode 102, or the first through holes 108 are formed with intervals in a column and are vertical to the horizontal main electrode 102, or the first through holes 108 are formed with intervals in sets of columns. The second through holes 109 are distributed in the same manner as the first through holes 108, and are not described herein again.

Figure 2:
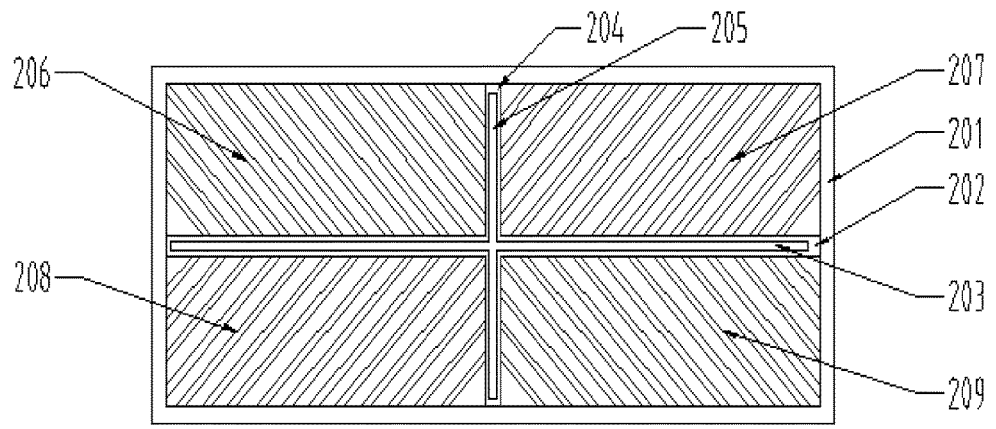
FIG. 2 is a structural schematic diagram of a pixel electrode provided by embodiment 1 of the present disclosure.

As shown in FIG. 2, which is a structural schematic diagram of a pixel electrode provided by embodiment 1 of the present disclosure, a peripheral border 201 surrounds the pixel electrode. The pixel electrode includes a horizontal main electrode 202 and a longitudinal main electrode 204 being perpendicular to each other and having a cross shape. The horizontal main electrode 202 includes a first through hole 203 and the longitudinal main electrode 204 has a second through hole 205. The first through hole 203 and the second through hole 205 divide the pixel electrode into a first sub-pixel electrode 206, a second sub-pixel electrode 207, a third sub-pixel electrode 208, and a fourth sub-pixel electrode 209. A hollow structure is located at a center of intersection of the horizontal main electrode 202 and the longitudinal main electrode 204, and the first sub-pixel electrode 206, the second sub-pixel electrode 207, the third sub-pixel electrode 208, and the fourth sub-pixel electrode 209 are connected with each other by the peripheral border 201.

Figure 3:
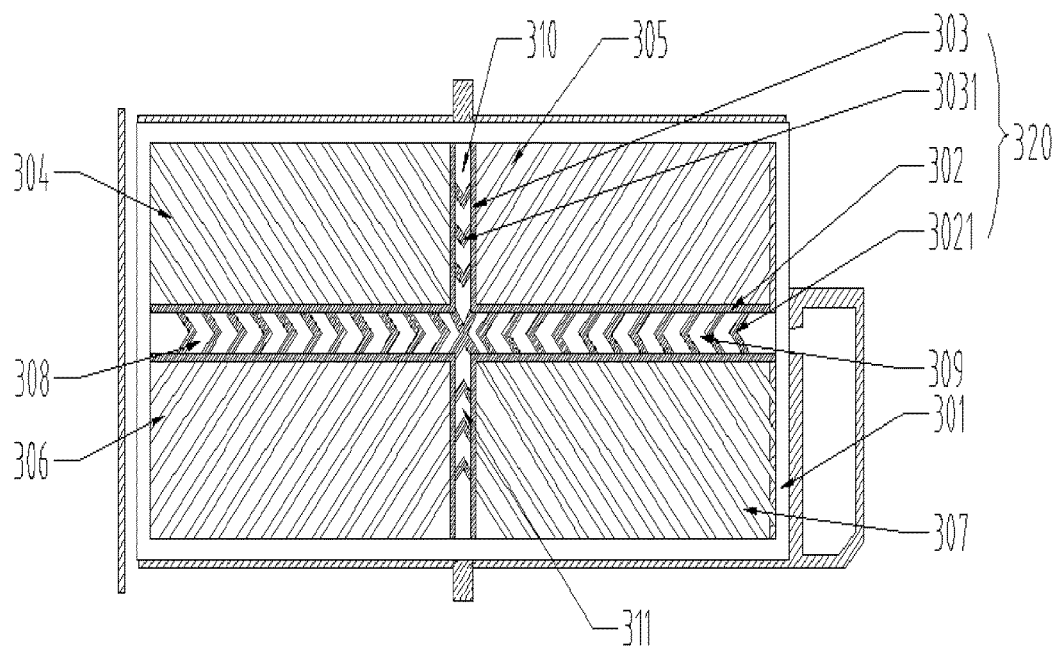
FIG. 3 is a structural schematic diagram of a pixel unit provided by embodiment 2 of the present disclosure.
Figure 4:
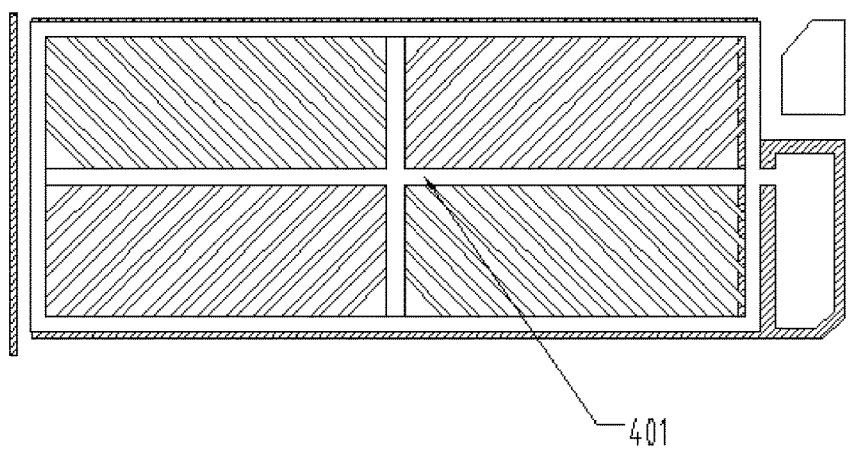
FIG. 4 is a structural schematic diagram of a pixel electrode of the conventional technology.

As shown in FIG. 3, which is a structural schematic diagram of a pixel unit provided by embodiment 2 of the present disclosure, the pixel unit includes: a peripheral border 301 surrounding a pixel electrode; a main electrode 320 connected with the peripheral border 301 and being cross-shaped, where the main electrode 320 includes a horizontal main electrode 302 and a longitudinal main electrode 303 perpendicular to each other, and the horizontal main electrode 302 and the longitudinal main electrode 303 divide the pixel electrode into four domains; and branch electrodes parallel to each other and disposed with intervals in one of the domains of the pixel electrode. Each of the branch electrodes is connected with the horizontal main electrode 302 or the longitudinal main electrode 303 at a third predetermined angle. The third predetermined angle is preferably at an angle between 10 degrees and 80 degrees. A first branch electrode 304 is parallel to a fourth branch electrode 307, a second branch electrode 305 is parallel to a third branch electrode 306, and a second predetermined angle is between the first branch electrode 304 and the third branch electrode 306. The second predetermined angle is preferably at an angle between 60 degrees and 120 degrees.

Each of the horizontal main electrodes 302 includes first main sub-electrodes 3021. Each of the longitudinal main electrodes 303 includes second main sub-electrodes 3031. The first main sub-electrodes 3021 are formed by extending the horizontal main electrode 302 in a region of the first through hole (108, as shown in FIG. 1) in an extending direction along the branch electrodes until the horizontal main electrode 302 intersects. The second main sub-electrodes 3031 are formed by extending the longitudinal main electrode 303 in a region of the second through hole (109, as shown in FIG. 1) in an extending direction along the branch electrodes until the longitudinal main electrode 303 intersects.

First slits 308 and second slits 309 arranged in a mirroring symmetry on a basis of the longitudinal main electrode 303 are formed from the horizontal main electrode 302, by using the first main sub-electrodes 3021. Third slits 310 and fourth slits 311 arranged in a mirroring symmetry on a basis of the horizontal main electrode 302 are formed from the longitudinal main electrode 303, by using the second main sub-electrodes 3031. The first slits 308, the second slits 309, the third slits 310, and the fourth slits 311 are all arranged with intervals. The first main sub-electrodes 3021 and the second main sub-electrodes 3031 overlap at an intersection of the horizontal main electrode 302 and the longitudinal main electrode 303.

The first slits 308, the second slits 309, the third slits 310, and the fourth slits 311 form a topography with grooves so as to cause liquid crystals to have a certain orientation. The irregular dark fringes will not be induced by an interaction of different tilting directions of the liquid crystals in regions of the first slits 308, the second slits 309, the third slits 310, and the fourth slits 311. Further, an electric field strength is decreased in a corresponding position of the horizontal main electrode 302 and the longitudinal main electrode 303, and therefore the effect of the electric field on the liquid crystals is also decreased. The tilting conflict of liquid crystals of the main electrode 320 between different sub-pixels will also be decreased, thereby reducing the effect of the dark fringes.

The first main sub-electrodes 3021 and the second main sub-electrodes 3031 can also not extend in an extending direction along the branch electrodes, such as vertically extending intersection, or arc extending intersection, etc., so as to form corresponding slits, which can constitute a topography with grooves. The specific shapes of the first main sub-electrodes 3021 and the second main sub-electrode 3031 are not limited herein.

The present disclosure further provides a liquid crystal display panel including the pixel unit described above.

Compared with a pixel unit in conventional technologies, in the pixel unit of the present disclosure, a hollowing process is correspondingly performed on a cross-shaped main electrode of a pixel electrode, such that the main electrode forms a hollow and cross-ring structure. The corresponding hollowed region of the main electrode forms a topography with grooves so as to cause liquid crystals to have a certain orientation. The irregular dark fringes will not be induced by an interaction of different tilting directions of the liquid crystals in the corresponding hollowed region. Further, an electric field strength is decreased in the corresponding hollowed region of the cross-shaped main electrode of the pixel electrode, and the effect of the electric field on the liquid crystals is also decreased, such that the tilting conflict of liquid crystals between the different sub-pixel electrodes divided by the main electrode will also be decreased. Therefore, the effect of the dark fringes is greatly reduced.

As described above, although the present disclosure has been described in preferred embodiments, they are not intended to limit the disclosure. One of ordinary skill in the art, without departing from the spirit and scope of the disclosure within, can make various modifications and variations, so the range of the scope of the disclosure is defined by the claims.

The invention claimed is:

1. A pixel unit, comprising:
   a peripheral border surrounding a pixel electrode;
   a main electrode connected with the peripheral border and being cross-shaped, wherein the main electrode comprises a horizontal main electrode and a longitudinal main electrode perpendicular to each other, and the horizontal main electrode and the longitudinal main electrode divide the pixel electrode into four domains;
   branch electrodes, wherein an end of each of the branch electrodes is connected with the peripheral border, and another opposite end is connected with the horizontal main electrode or the longitudinal main electrode;
   wherein, in one of the domains of the pixel electrode, the branch electrodes are arranged parallel to each other and spaced from each other, and each of the branch electrodes is connected with the horizontal main electrode or the longitudinal main electrode at a first predetermined angle;
   wherein a first branch electrode is parallel to a fourth branch electrode, a second branch electrode is parallel to a third branch electrode, and a second predetermined angle is between the first branch electrode and the third branch electrode;
   wherein the horizontal main electrode has a first through hole and the longitudinal main electrode has a second through hole, and the first through hole and the second through hole in communication with each other, such that the main electrode forms a cross-ring shape;
   wherein a hollow structure is located at a center of an intersection of the horizontal main electrode and the longitudinal main electrode; a first sub-pixel electrode, a second sub-pixel electrode, a third sub-pixel electrode, and a fourth sub-pixel electrode are connected with each other by the peripheral border; and
   wherein the pixel unit further comprises a light shielding metal layer and a common electrode, wherein the light shielding metal layer has a light shielding electrode, wherein a horizontal light shielding electrode corresponds to the horizontal main electrode, a longitudinal light shielding electrode corresponds to the longitudinal main electrode, and the horizontal light shielding electrode and the longitudinal light shielding electrode are both connected with the common electrode.

2. The pixel unit according to claim 1, wherein a projection of the horizontal light shielding electrode at the pixel electrode covers the first through hole, and a projection of the longitudinal light shielding electrode at the pixel electrode covers the second through hole.

3. The pixel unit according to claim 1, wherein a width of the horizontal light shielding electrode is same as a width of the longitudinal light shielding electrode.

4. The pixel unit according to claim 1, wherein the first through hole extends in an extending direction along the horizontal main electrode from an end of the horizontal main electrode to another end of the horizontal main electrode, and the second through hole extends in an extending direction along the longitudinal main electrode from an end of the longitudinal main electrode to another end of the longitudinal main electrode; and wherein the first through hole and the second through hole divide the pixel electrode into a first sub-pixel electrode, a second sub-pixel electrode, a third sub-pixel electrode, and a fourth sub-pixel electrode.

5. The pixel unit according to claim 4, wherein first main sub-electrodes in a region of the first through hole of the horizontal main electrode extend in an extending direction along the branch electrodes until the first main sub-electrodes intersect, and second main sub-electrodes in a region of the second through hole of the longitudinal main electrode extend in an extending direction along the branch electrodes until the second main sub-electrodes intersect.

6. The pixel unit according to claim 5, wherein the first main sub-electrodes and the second main sub-electrodes overlap at an intersection of the horizontal main electrode and the longitudinal main electrode.

7. The pixel unit according to claim 1, wherein a fifth sub-pixel electrode extends from an end of the horizontal main electrode to the peripheral border outwardly, and in a corresponding region of the fifth sub-pixel electrode corresponding to the horizontal main electrode, the pixel electrode is connected with a switching unit through a third through hole.

8. A liquid crystal display panel, comprising a pixel unit according to claim 1.

9. A pixel unit, comprising:
a peripheral border surrounding a pixel electrode;
a main electrode connected with the peripheral border and being cross-shaped, wherein the main electrode comprises a horizontal main electrode and a longitudinal main electrode perpendicular to each other, and the horizontal main electrode and the longitudinal main electrode divide the pixel electrode into four domains;
branch electrodes, wherein an end of each of the branch electrodes is connected with the peripheral border, another opposite end is connected with the horizontal main electrode or the longitudinal main electrode;
wherein, in one of the domains of the pixel electrode, the branch electrodes are arranged parallel to each other and spaced from each other, and each of the branch electrodes is connected with the horizontal main electrode or the longitudinal main electrode at a first predetermined angle;
wherein a first branch electrode is parallel to a fourth branch electrode, a second branch electrode is parallel to a third branch electrode, and a second predetermined angle is between the first branch electrode and the third branch electrode;

wherein the horizontal main electrode has a first through hole and the longitudinal main electrode has a second through hole, and the first through hole and the second through hole in communication with each other, such that the main electrode forms a cross-ring shape; and wherein the pixel unit further comprises a light shielding metal layer and a common electrode, wherein the light shielding metal layer has a light shielding electrode, wherein a horizontal light shielding electrode corresponds to the horizontal main electrode, a longitudinal light shielding electrode corresponds to the longitudinal main electrode, and the horizontal light shielding electrode and the longitudinal light shielding electrode are both connected with the common electrode.

10. The pixel unit according to claim 9, wherein a projection of the horizontal light shielding electrode at the pixel electrode covers the first through hole, and a projection of the longitudinal light shielding electrode at the pixel electrode covers the second through hole.

11. The pixel unit according to claim 9, wherein a width of the horizontal light shielding electrode is same as a width of the longitudinal light shielding electrode.

12. The pixel unit according to claim 9, wherein the first through hole extends in an extending direction along the horizontal main electrode from an end of the horizontal main electrode to another end of the horizontal main electrode, and the second through hole extends in an extending direction along the longitudinal main electrode from an end of the longitudinal main electrode to another end of the longitudinal main electrode; and wherein the first through hole and the second through hole divide the pixel electrode into a first sub-pixel electrode, a second sub-pixel electrode, a third sub-pixel electrode, and a fourth sub-pixel electrode.

13. The pixel unit according to claim 12, wherein first main sub-electrodes in a region of the first through hole of the horizontal main electrode extend in an extending direction along the branch electrodes until the first main sub-electrodes intersect, and second main sub-electrodes in a region of the second through hole of the longitudinal main electrode extend in an extending direction along the branch electrodes until the second main sub-electrodes intersect.

14. The pixel unit according to claim 13, wherein the first main sub-electrodes and the second main sub-electrodes overlap at an intersection of the horizontal main electrode and the longitudinal main electrode.

15. The pixel unit according to claim 9, wherein a fifth sub-pixel electrode extends from an end of the horizontal main electrode to the peripheral border outwardly, and in a corresponding region of the fifth sub-pixel electrode corresponding to the horizontal main electrode, the pixel electrode is connected with a switching unit through a third through hole.

* * * * *